United States Patent [19]

Largenton

[11] Patent Number: 4,887,678

[45] Date of Patent: Dec. 19, 1989

[54] DEVICE FOR WEIGHING VEHICLES

[76] Inventor: Jean-Luc Largenton, 9, rue des Parmentiers, Metz, France, 57000

[21] Appl. No.: 288,700

[22] Filed: Dec. 22, 1988

[30] Foreign Application Priority Data

Dec. 24, 1987 [FR] France .................................. 87 18159

[51] Int. Cl.⁴ ...................... G01G 19/02; G01G 21/22
[52] U.S. Cl. ..................................... 177/134; 177/263
[58] Field of Search .................................. 177/134, 135

[56] References Cited

U.S. PATENT DOCUMENTS 2,962,275 11/1960 Thurston ........................ 177/134 X
4,203,497 5/1980 Harris et al. ........................ 177/134
4,453,606 6/1984 Mokhbery et al. ............. 177/134 X Primary Examiner—George H. Miller, Jr.
Attorney, Agent, or Firm—Pollock, VandeSande and Priddy

[57] ABSTRACT

Device for weighing vehicles, comprising a floor which has a general rectangular shape and is supported on a base by means of force sensors, characterized in that the floor consists of at least two panels (5), these panels being arranged so as to rest at their ends on at least two cross beams (1, 2, 3) resting at their ends on sensors (7).

13 Claims, 7 Drawing Sheets

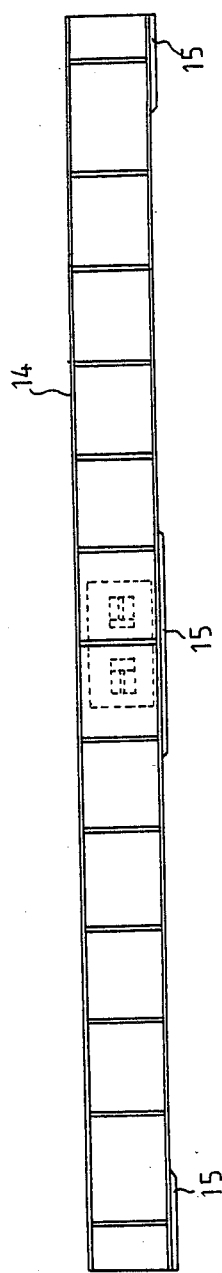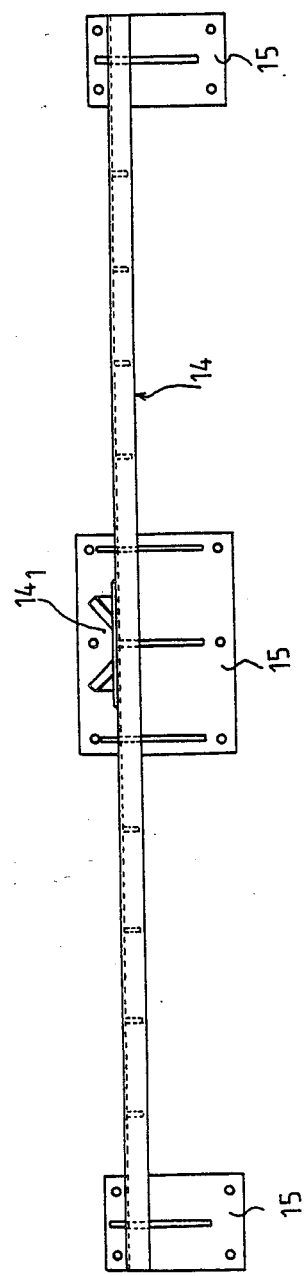
FIG.6
FIG.7

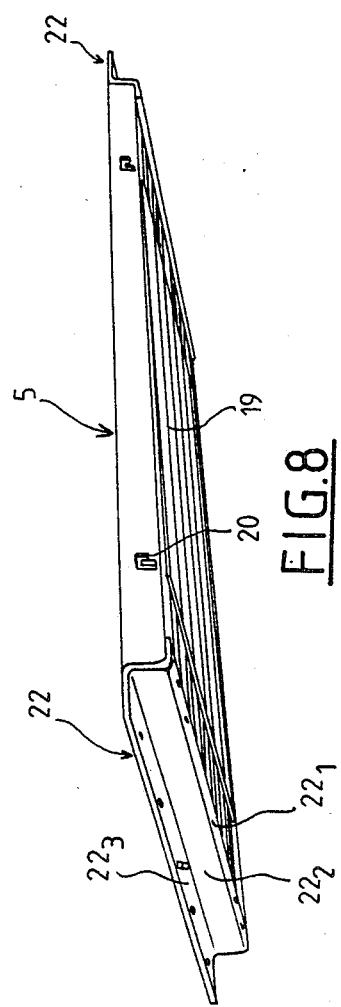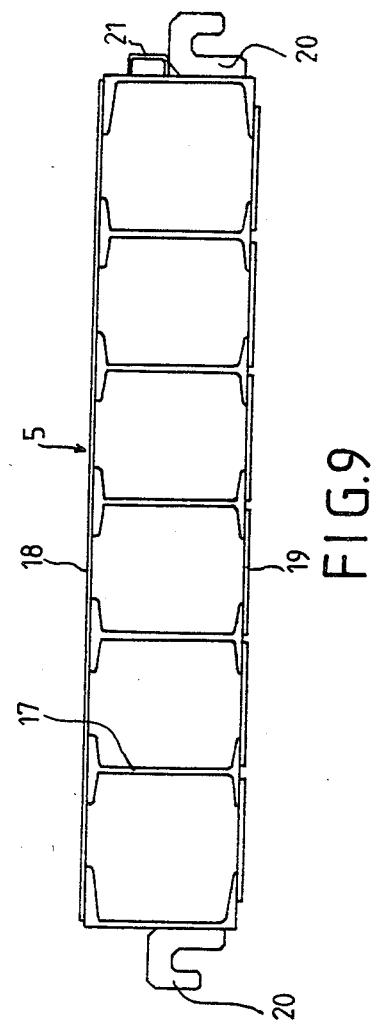

DEVICE FOR WEIGHING VEHICLES

BACKGROUND OF THE INVENTION

The invention relates to a device for weighing vehicles.

The known devices of this kind consist of longitudinal beams which are joined to each other by cross struts forming together a structure which is rigid and onto which longitudinal members are fixed. The concrete or steel floor is then positioned so as to rest on these longitudinal members.

However, such an arrangement has various drawbacks associated, in particular, with the relatively significant height of the device, the difficulty of transporting and assembling the device and its high cost, this cost being further increased by the fact that the longitudinal beams must be extremely rigid despite their length, in order to prevent them sagging excessively when the device supports a weight, this sagging effect influencing in such a case the accuracy of the weighing operation.

SUMMARY OF THE INVENTION

The object of the present invention is to overcome the foregoing drawbacks and the invention thus relates to a device for weighing vehicles, comprising a floor which has a general rectangular shape and is supported on a base by means of force sensors, characterized in that the floor consists of at least two panels, these panels being arranged so as to bear at their ends on at least two cross beams resting at their ends on sensors.

According to another characteristic feature of the invention, the cross beams support the ends of the two panels which define a channel (8) between them.

According to another characteristic feature of the invention, the cross beams have, at their ends, surfaces resting on the sensors, themselves arranged so as to rest on the base, these surfaces at the ends of the beams being offset towards the upper side of the beam.

According to another characteristic feature of the invention, the cross beams are provided, at their ends, with Z-shaped sections, the top and bottom horizontal flanges of which rest on the beams, the vertical flange and the bottom horizontal flange being fixed, by means of welding, to the end edges of the panels and to the lower side of the latter, respectively.

According to another characteristic feature of the invention, the device has three equidistant cross beams, the floor consisting of four panels positioned in pairs so as to rest on an end cross and on the middle cross beam.

BRIEF DESCRIPTION OF THE DRAWINGS

The invention is shown by way of a non-limiting example in the accompanying drawings in which:

FIGS. 6 and 7 are a longitudinal section and a plan view, respectively, of the fixed end cross-piece of the device shown in FIG. 1;

FIG. 8 is a perspective view of a panel of the floor of the device shown in FIG. 1;

FIG. 9 is a cross sectional view of the panel shown in FIG. 8;

DESCRIPTION OF THE PREFERRED EMBODIMENTS

Figure 1:
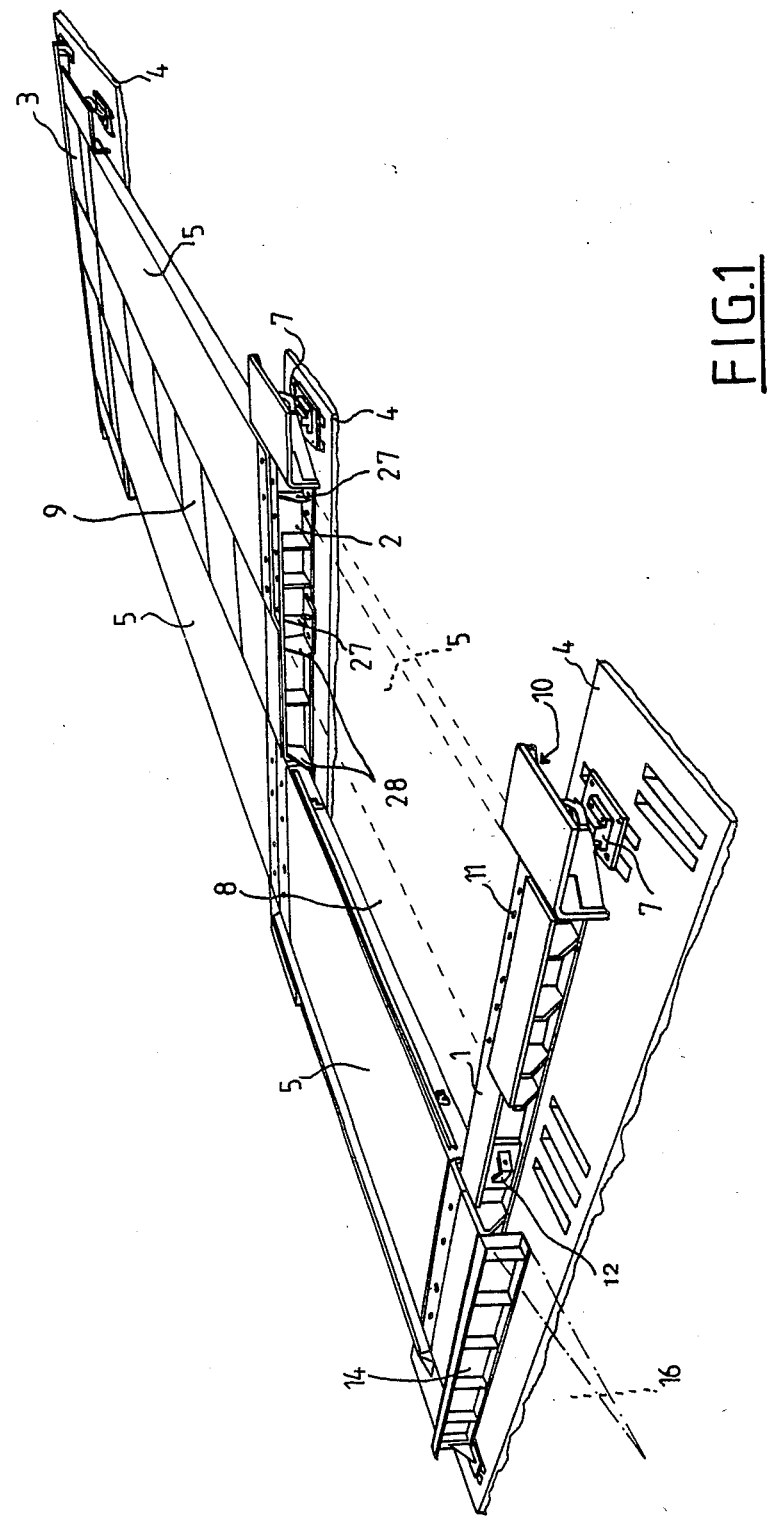
FIG. 1 is a perspective view of a first embodiment of the weighing device.
Figure 5:
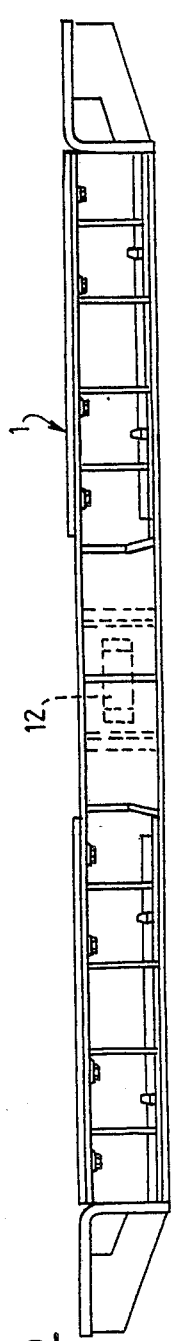
FIGS. 4 and 5 are a plan view and a side view, respectively, of one of the end cross beams of the device shown in FIG. 1.
Figure 4:
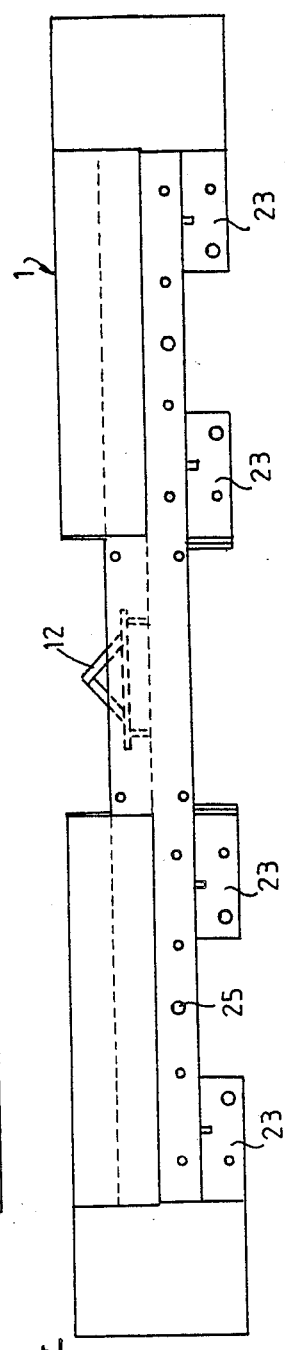
Figure 3:
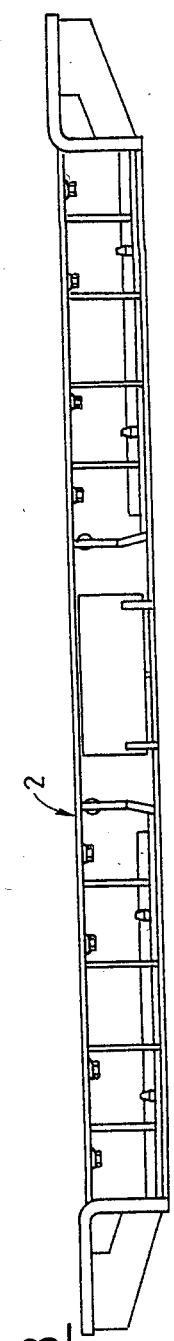
FIGS. 2 and 3 are a plan view and a side view, respectively, of the middle cross beam of the device shown in FIG. 1.
Figure 2:
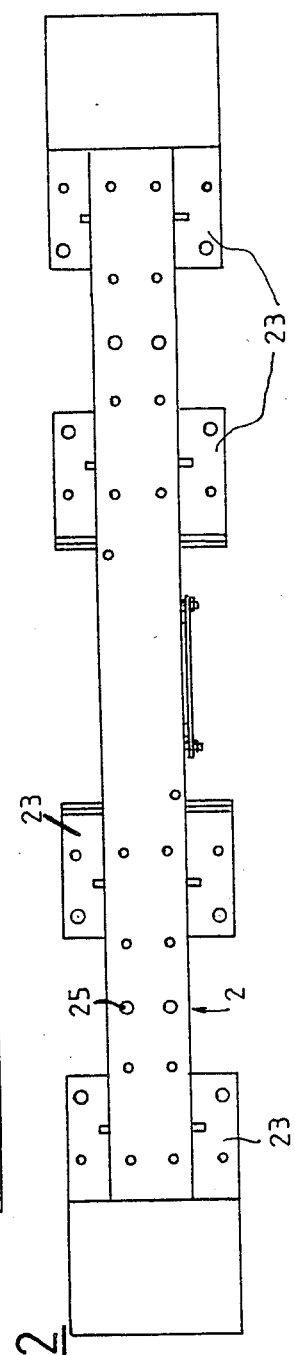
Figure 10:
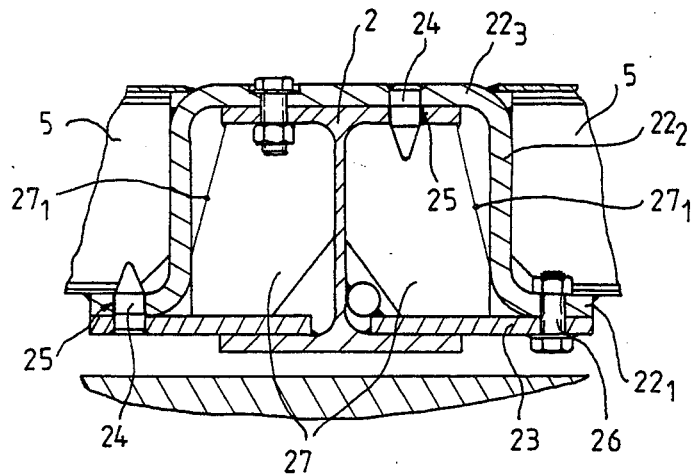
FIG. 10 is a partial section showing the bearing arrangement of the panels on the cross beams.

The vehicle weighing device shown in FIGS. 1 to 10 comprises three cross beams 1, 2 and 3 which are arranged so as to rest on a base 4 consisting, in this case, of three concrete plinths each positioned under one of the beams.

These three equidistant and parallel cross beams 1, 2 and 3, support, in pairs, four panels 5 which are each mounted so as to bear, via their ends, on the one hand on the middle cross beam 2 and on the other hand on an end cross beam 1 or 3.

As a result of this arrangement, it is possible to provide weighing devices which are easy to construct, transport and assemble, and which have a low cost.

In fact, in this structure, the cross beams 1, 2 and 3 the length of which is only slightly greater than the width of a vehicle, rest with their ends on force sensors 7, while the panels 5, which have an identical length, are positioned in pairs parallel to each other, defining between them a channel 8 which, if necessary, can be closed by a grate 9.

In this case, the support structure therefore consists solely of equidistant cross beams which support, in pairs, panels 5 forming tracks for the vehicle to be weighed.

As a result of this arrangement, it also possible to provide, without any additional constraints, weighing devices of very considerable length. To achieve this, all that is required is, in fact, to add one or more cross beams and join them to those in front by means of a pair of panels 5 positioned parallel to and at a distance from each other.

The cross beams 1, 2 and 3 are mounted so as to rest on force sensors 7 via support surfaces 10 which are offset towards the upper side 11 of the beams 1, 2 and 3, so as to reduce the height of the weighing device and thus avoid the need to dig a trench, together with all the ensuing drawbacks.

The end beams (see FIGS. 1, 4 and 5) are also provided with a projection 12 formed on their side face directed towards the outside of the weighing device. These projections, which in this case are constructed so as to have a triangular shape, are intended to be positioned inside a recess with a corresponding shape $14_1$ formed in a cross-piece 14 (see FIGS. 1, 6 and 7). These cross-pieces 14 are fixed onto the plinths 4 of the base by means of support surfaces 15 and are arranged inside the wall of the ramp 16 (FIG. 1) intended to allow vehicles to drive onto the weighing device. These cross-pieces 14, thus receiving in their recesses $14_1$ the projections 13 of the beams 1 and 2, form impact buffers which limit the longitudinal and transverse movements of the actual weighing part consisting of the cross beams and the panels 5.

The panels 5 consist of parallel profiled members 17 (see FIG. 9) which are assembled together by means of welding, on the one hand via the travelling surface 18 and on the other hand via bottom assembly plates 19.

The edges of these panels are provided with hooks 20 which allow the said panels to be handled by a lifting means when they are assembled on the beams 1, 2 and 3. The longitudinal edge of the panels located inside the device also has a profiled part 21 on which the plates of the grate 9 closing the channel rest.

The ends of these panels 5 have Z-shaped sections 22, the bottom horizontal flange $22_1$ of which is fixed by means of welding underneath the lower end side of this panel 5.

The vertical flange $22_2$ is itself fixed by means of welding onto the edge of the end of the panel 5.

Moreover, the cross beams have (see FIGS. 2 to 5) bottom support plates 23 while the height of the Z-shaped section 22 is determined so that the horizontal flanges $22_1$ and $22_3$ rest, respectively, on these plates 23 and on the upper side of the beams 1, 2 and 3, so as to provide an extremely strong bearing arrangement for the panels on the beams, while distributing the load supported by the panels over their entire width and hence over the corresponding part of the beams.

The panels 5, when they are arranged in position on beams, are guided by studs 24 (see FIG. 10) with a conical end provided on the Z-shaped section 22 and on the beams 23, these studs being accommodated inside bores with a corresponding cross-section formed in the facing part.

The studs 24, which facilitate guiding of the panels when the latter are arranged in position, also form means which help strengthen the structure of the weighing device, in particular by preventing relative lateral movement of the panels with respect to the beams.

These studs thus help strengthen the structure of the weighing device in which the cross beams are joined together solely by the panels 5 themselves. This assembly is consolidated by bolts 26.

Also, the cross beams 1, 2 and 3 are provided (see FIGS. 1 and 10) with inclined reinforcing parts 27, the external edge $27_1$ of which forms a slanting surface parallel to the longitudinal axis of the beam, these slanting surfaces enabling the panel 5 to be guided and centered longitudinally when they are positioned on the beams. Also, these beams are provided (see FIG. 1) with slanting plates 28 arranged parallel to the longitudinal axis of the device so as to ensure guiding and transverse centering of the panels 5 when they are arranged in position.

Figure 11:
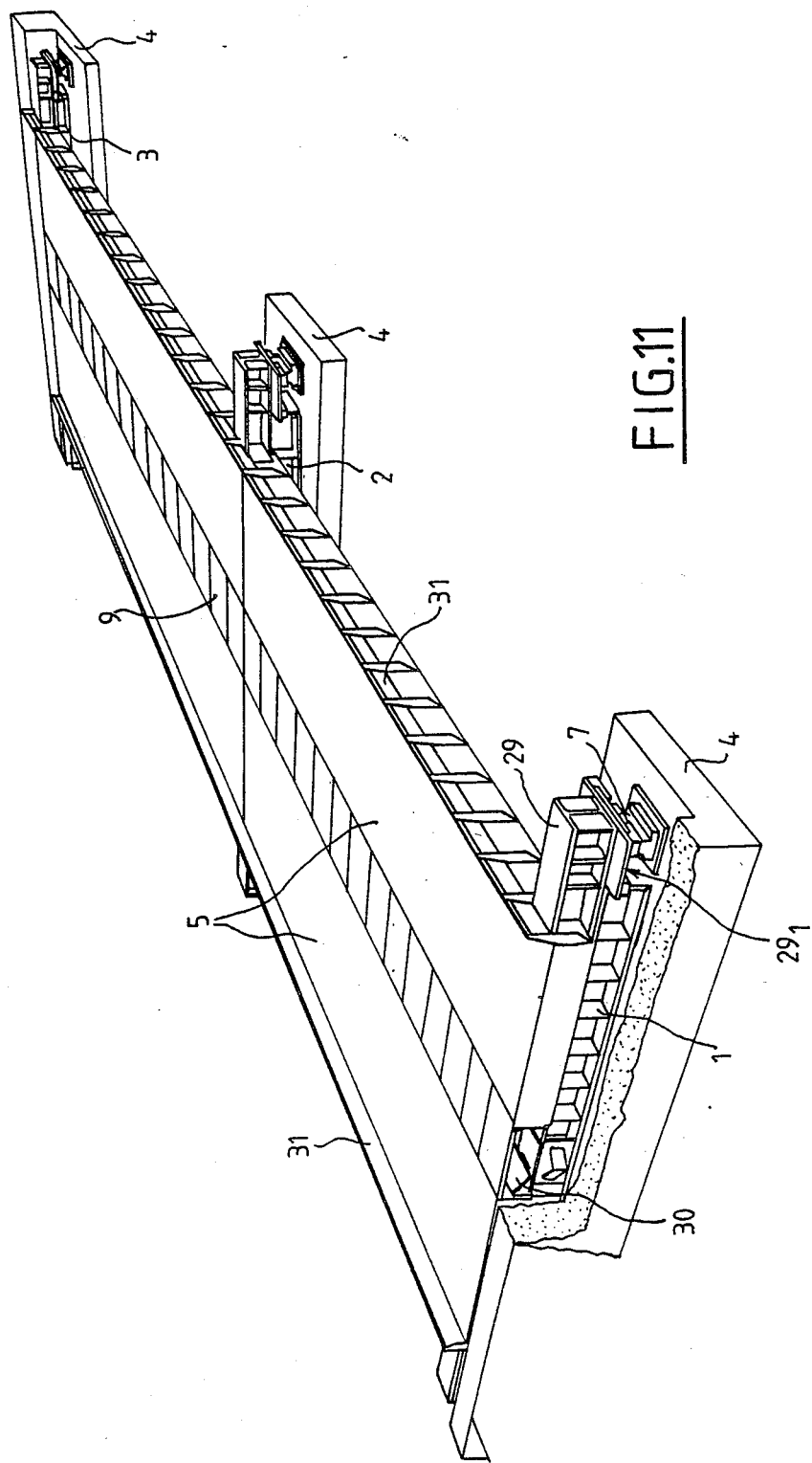
FIG. 11 is a perspective view of another embodiment of the weighing device according to the invention.
Figure 12:
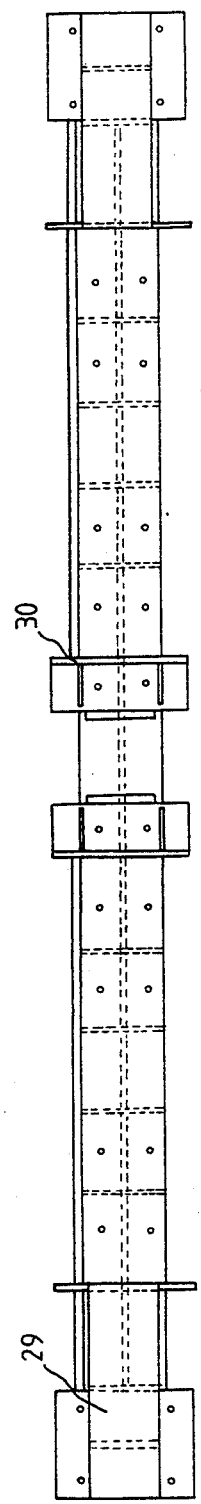
FIGS. 12 and 13 are a plan view and a side view, respectively, of the cross beams of the device shown in FIG. 11.
Figure 13:
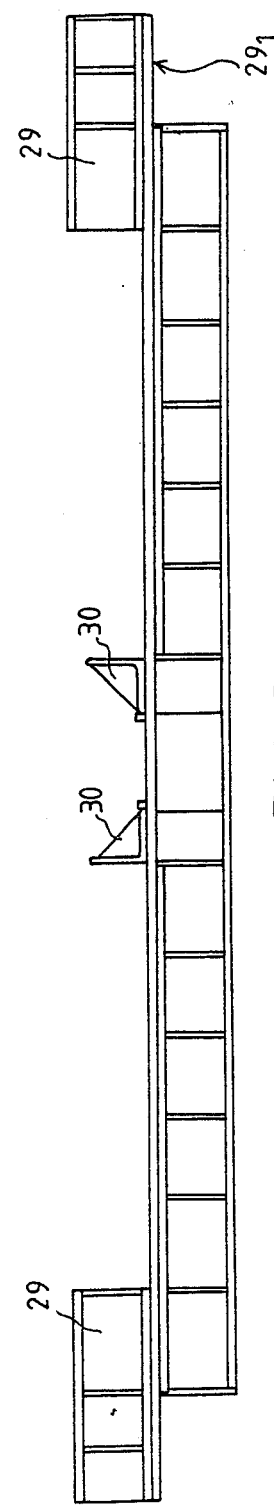
Figure 14:
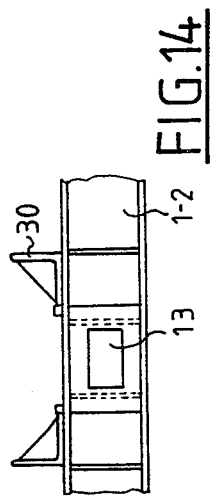
FIG. 14 is a side view of the central part of an end cross beam.

According to the example of embodiment shown in FIGS. 11 to 14, the cross beams 1, 2 and 3 supporting the panels 5 in pairs are provided at the end of their upper side with projecting parts 29 so that the lower side $29_1$ of these parts 29 forms the bearing surface for the force sensors 7.

In this case, these projecting parts 29 also form means for laterally positioning the panels 5 arranged so as to rest on the beams 1, 2 and 3. Angle brackets 30 can also be provided on the cross beams so as to ensure lateral positioning of the opposite side of the panels 5. The end cross beams also have the lateral projection 13 which cooperates with the corresponding recess $14_1$ in the fixed cross-piece 14 so as to form an impact buffer.

Each of the panels 5 is also provided, on its longitudinal side located outside the device, with a shoulder 31 projecting over the upper side of these panels so as to form a guiding shoulder for the wheels of the vehicle.

I claim:

1. Device for weighing vehicles, comprising a floor which has a general rectangular shape and is supported on a base by means of force sensors, said floor consisting of at least two panels which are arranged so as to bear at their ends on at least two cross beams resting at their ends on said sensors, said cross beams having, at their ends, surfaces resting on the sensors, the sensors being arranged so as to rest on the base, said surfaces at the ends of each of the beams being offset towards the upper side of the beam.

2. Device according to claim 1 wherein the said two panels define a channel between them.

3. Device according to claim 2 wherein the channel is closed by a grate resting laterally on the panels.

4. Device according to claim 1 wherein said offset surfaces are on the lower side of fixed parts projecting over the upper side of the ends of the beams, these projecting parts forming shoulders for positioning the floor panels.

5. Device according to claim 1 wherein the cross beams have at least one projection on their side face directed towards the outside of the device, said projections being positioned with lateral play inside corresponding recesses provided on the base.

6. Device according to claim 5 wherein said recesses for the lateral projections of the beams are formed in cross-pieces fixed into the base laterally and at a short distance from the cross beams.

7. Device according to claim 1 wherein the panels have a longitudinal shoulder projecting over the upper side of the panels, said shoulder being situated longitudinally relative to the periphery of the device.

8. Device according to claim 1 wherein the cross beams are provided, at their ends, with Z-shaped sections having a top horizontal flange and a bottom horizontal flange which rest on the beams, each of said Z-shaped sections also having a vertical flange and the bottom horizontal flange being fixed, by means of welding, to the end edges of the panels and the lower side of the panels respectively.

9. Device according to claim 1 wherein the ends of the panels are centered and positioned on the beams by studs accommodated inside orifices having a corresponding cross-section.

10. Device according to claim 1 wherein hooks are provided laterally on the edge of the panels.

11. Device according to claim 1 wherein the beams and/or the panels are provided with slanting support surfaces for guiding the panels when they are arranged in position on the beams.

12. Device according to claim 11 wherein the slanting support surfaces comprise first support surfaces directed parallel to the beams and second support surfaces directed parallel to the longitudinal axis of the device.

13. Device according to claim 1 wherein said beams comprise three equidistant cross beams, the floor consisting of four panels positioned in pairs so as to rest on an end cross beam and on the middle cross beam.

* * * * *